US012747994B1

(12) United States Patent
Zhou et al.

(10) Patent No.: US 12,747,994 B1
(45) Date of Patent: Sep. 29, 2026

(54) TEMPERATURE RAMP CONTROL FOR INTEGRATED CIRCUIT CHIPS

(71) Applicant: Auradine, Inc., Santa Clara, CA (US)

(72) Inventors: Leon Zhou, Santa Clara, CA (US); Nicholas Cabi, San Jose, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/294,925

(22) Filed: Aug. 8, 2025

Related U.S. Application Data

(63) Continuation of application No. 18/977,137, filed on Dec. 11, 2024, now Pat. No. 12,392,670.

(51) Int. Cl.
*G01K 7/10* (2006.01)
*G01K 7/01* (2006.01)
*G06F 1/20* (2006.01)

(52) U.S. Cl.
CPC ............... *G01K 7/10* (2013.01); *G01K 7/015* (2013.01); *G06F 1/206* (2013.01)

(58) Field of Classification Search
CPC ........... G01K 7/10; G01K 7/015; G06F 1/206
See application file for complete search history.

(56) References Cited

U.S. PATENT DOCUMENTS 8,988,881 B2 * 3/2015 Koplow .............. F04D 25/0606 165/122
9,360,907 B2 6/2016 Doshi et al.
9,854,715 B2 * 12/2017 Shedd ................. F28D 15/0266
12,026,550 B1 7/2024 Carlson et al.
12,243,827 B1 * 3/2025 Liu ....................... H10W 40/00
2022/0413570 A1 * 12/2022 Nagimov .................. G06F 1/20
2023/0273839 A1 8/2023 Guim Bernat et al.

FOREIGN PATENT DOCUMENTS

KR 2007-0118683 A 12/2007

OTHER PUBLICATIONS

Ramakrishnan, et al., CPU Overclocking: A Performance Assessment of Air, Cold Plates, and Two-Phase Immersion Cooling, Oct. 2021, IEEE Transactions On Components, Packaging and Manufacturing Technology, vol. 11, No. 10, pp. 1703-1715 (Year: 2021).*

(Continued)

*Primary Examiner* — Mi'schita' Henson
(74) *Attorney, Agent, or Firm* — Fish & Richardson P.C.

(57) ABSTRACT

A circuit system includes a circuit board including a plurality of integrated circuit (IC) chips. The circuit board is configured to be immersed in a two-phase cooling fluid. The circuit system includes a controller. The controller is configured to, in a control process: obtain temperature data indicative of respective internal temperatures of the plurality of IC chips, predict respective future internal temperatures of the plurality of IC chips based on the respective internal temperatures, and adjust clock frequencies and power supply voltages of the plurality of the IC chips such that the predicted respective future internal temperatures are within a target temperature range. A clock frequency of a first IC chip of the plurality of IC chips is adjusted to be different from a clock frequency of a second IC chip of the plurality of IC chips.

20 Claims, 10 Drawing Sheets

(56) References Cited

OTHER PUBLICATIONS

Feng et al., Two-Phase Liquid Cooling of Vertically Stacked High-Power Chips With Backside-Embedded Micro-Pin Fins, Jan. 2026, IEEE Transactions on Components, Packaging and Manufacturing Technology, vol. 16, issue 1, pp. 244-247 (Year: 2026).*
Heydari et al., Abstract of "Refrigerant to Air Cooling for High Heat Density Two-Phase Cooled Data Centers", May 30, 2023, 2023 22nd IEEE Intersociety Conference on Thermal and Thermomechanical Phenomena in Electronic Systems (ITherm) (2023, pp. 1-7) (Year: 2023).*

* cited by examiner

TEMPERATURE RAMP CONTROL FOR INTEGRATED CIRCUIT CHIPS

CROSS-REFERENCE TO RELATED APPLICATIONS

This application is a continuation of U.S. patent application Ser. No. 18/977,137, filed on Dec. 11, 2024, the contents of which are hereby incorporated by reference herein in its entirety.

FIELD OF THE DISCLOSURE

This specification generally relates to temperature control for multiple integrated circuit (IC) chips.

BACKGROUND

An electronic circuit can include multiple IC chips. Each of the IC chips can generate signals indicative of computations performed by the IC chips. The IC chips can heat up during operation.

SUMMARY

Some aspects of this disclosure relate to a circuit system. The circuit system includes a circuit board including a plurality of integrated circuit (IC) chips. The circuit board is configured to be immersed in a two-phase cooling fluid. The circuit system includes a controller. The controller is configured to, in a control process: obtain temperature data indicative of respective internal temperatures of the plurality of IC chips, predict respective future internal temperatures of the plurality of IC chips based on the respective internal temperatures, and adjust clock frequencies and power supply voltages of the plurality of the IC chips such that the predicted respective future internal temperatures are within a target temperature range. A clock frequency of a first IC chip of the plurality of IC chips is adjusted to be different from a clock frequency of a second IC chip of the plurality of IC chips.

This and other circuit systems described herein can have one or more of at least the following characteristics.

In some implementations, the controller is configured to predict a future internal temperature of the first IC chip based on at least one of a candidate power supply voltage for the first IC chip or a candidate clock frequency of the first IC chip.

In some implementations, the controller is configured to predict a future internal temperature of the first IC chip based on at least one of a candidate power supply voltage or a candidate clock frequency of a third IC chip of the plurality of IC chips.

In some implementations, an effect of the at least one of the candidate power supply voltage or the candidate clock frequency of the third IC chip on the predicted future internal temperature of the first IC chip is based on a physical proximity between the first IC chip and the third IC chip on the circuit board.

In some implementations, for a same iteration of the control process, a predicted change in internal temperature of the first IC chip is different from a predicted change in internal temperature of the second IC chip.

In some implementations, the prediction of the respective future internal temperatures is based on an estimate of an amount of convective heat dissipation from the plurality of IC chips to the two-phase cooling fluid.

In some implementations, predicting the respective future internal temperature includes accessing a stored data structure indicating a defined relationship between changes in clock frequency and changes in IC chip temperature for IC chips immersed in the two-phase cooling fluid.

In some implementations, the controller is configured to: determine, based on the temperature data, that a temperature of the first IC chip satisfies a threshold condition; based on determining that the temperature of the first IC chip satisfies the threshold condition, label the first IC chip as de-rated; and adjust a predicted future internal temperature of the first IC chip based on the first IC chip being labeled as de-rated.

In some implementations, the controller is configured to adjust a target aggregate computation rate of a group of IC chips that includes the first IC chip, based on the first IC chip being labeled as de-rated.

In some implementations, the controller is configured to increase the target temperature range with increasing temperature of the two-phase cooling fluid, while the two-phase cooling fluid is in a convection regime.

In some implementations, the controller is configured to adjust the clock frequencies and the supply voltages such that a ramp condition associated with rapid ramping of operation of the circuit system is satisfied.

In some implementations, the controller is configured to execute an iteration of the control process based on sensor data corresponding to multiple prior iterations of the control process.

In some implementations, the controller is configured to decrease an iteration rate of the control process with increasing temperature of the two-phase cooling fluid.

In some implementations, each of the plurality of IC chips includes a respective temperature sensor configured to output the respective internal temperature of the IC chip.

In some implementations, the controller is configured to: determine that the two-phase cooling fluid has reached a boiling temperature; and based on determining that the two-phase cooling fluid has reached the boiling temperature, increase the target temperature range for the plurality of IC chips.

In some implementations, the circuit system includes the two-phase cooling fluid, the circuit board is immersed in the two-phase cooling fluid.

In some implementations, the target temperature range includes a specified lower bound and a specified upper bound.

In some implementations, the plurality of IC chips is a subset of a total number of IC chips on the circuit board.

Some aspects of this disclosure relate to a circuit system that includes a circuit board including a plurality of integrated circuit (IC) chips. The circuit board is configured to be immersed in a two-phase cooling fluid. The circuit system includes a controller The controller is configured to: obtain temperature data indicative of respective internal temperatures of the plurality of IC chips, obtain candidate clock frequencies and candidate supply voltages for the plurality of IC chips, and predict respective future internal temperatures of the plurality of IC chips based on the respective internal temperatures and based on the candidate clock frequencies and the candidate supply voltages. A respective future internal temperature of a first IC chip of the plurality of IC chips is based on (i) a candidate clock frequency and a candidate supply voltage of a second IC chip of the plurality of IC chips and (ii) a proximity between the first IC chip and the second IC chip. The controller is configured to adjust clock frequencies and power supply voltages of the plurality of the IC chips such that the predicted respective future internal temperatures are within a target temperature range. A clock frequency of the first IC chip is adjusted to be different from a clock frequency of the second IC chip.

The foregoing and other circuit systems described herein can correspond at least to circuit system control methods, computer systems (e.g., controllers), and non-transitory storage media, each of which is also within the scope of the present disclosure.

DETAILED DESCRIPTION

Figure 1:
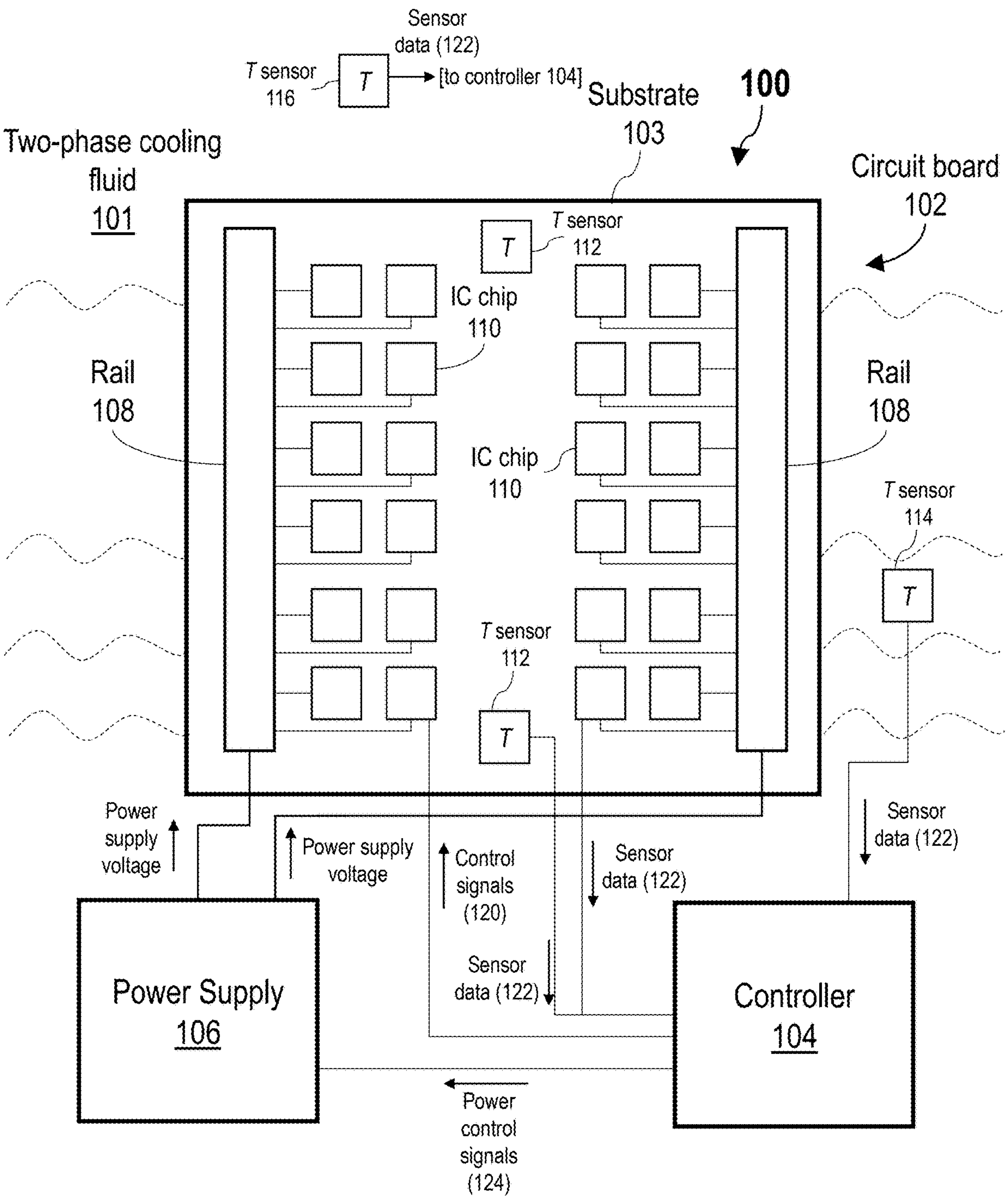
FIG. 1 is a diagram illustrating an example of a circuit system incorporating temperature control.

This disclosure relates to controlled ramping (e.g., ramping of clock frequency and power supply voltage) of computing systems including IC chips, e.g., a computing system with IC chips immersed in a two-phase cooling fluid. In a two-phase immersion configuration, components to be cooled are immersed in a fluid, e.g., a fluorocarbon-based fluid, which absorbs heat from the components. The fluid may be mostly or entirely uncirculated, with cooling being provided by the fluid's cycling between liquid and vapor phases. Two-phase cooling fluids can exhibit superior heat flux (corresponding to cooling capacity), in comparison to other cooling mediums such as air or single-phase cooling fluids.

Two-phase immersion cooling is different from other cooling methods in that the cooling fluid is generally not circulated, such that the primary mode of heat dissipation is through evaporation. The cooling capacity of a two-phase cooling fluid (e.g., heat transfer from components to the cooling fluid), therefore, increases when the cooling fluid is boiling. The boiling state for a cooling system as a whole is not binary. Rather, when submerged components are hotter than the cooling fluid, at least localized boiling may occur, even if the cooling fluid as a whole is not boiling or is not at its boiling temperature.

The two-phase cooling fluid can initially be in a convection stage, or convection regime, in which the computing system immersed in the two-phase cooling fluid is cooled only or primarily by convection. The cooling fluid eventually transitions, when the cooling fluid is at its boiling temperature, to a high-flux regime at which cooling capacity rises dramatically.

The relatively low heat transfer associated with convection cooling can result in components of the computing system, such as IC chips, overheating. Absent careful control, components operating while the system is in the convection regime may overheat within seconds. Further, overheating can cause thermal interface materials and/or elements of the components to break down, further reducing heat transfer. Due to these and/or other effects, over time, repeated heat cycles in the convection regime may cause lasting damage to components (e.g., damage to thermal paste) and limit computing performance.

Some implementations according to this disclosure provide controlled system ramping to bring two-phase immersion-cooled systems from an initial low temperature to a target high temperature range (e.g., a target high temperature for the cooling fluid) at which the immersion cooling provides high cooling capacity. For example, the control processes described herein can be applied to systems including dozens or hundreds of IC chips, in some cases distributed across multiple boards immersed in a common tank. Based on the disclosed processes and systems, the computing chips can be controlled from startup to full-capacity operation (at which the two-phase cooling fluid is in a boiling regime) while maintaining safe temperatures.

FIG. 1 illustrates an example of a circuit system 100 incorporating temperature control, according to some implementations of the present disclosure. The circuit system 100 includes a circuit board 102, a controller 104, and a power supply 106. At least the circuit board 102 is immersed in a two-phase cooling fluid 101, e.g., a dielectric fluid such as a fluorinated fluid. For example, the two-phase cooling fluid 101 can include one or more of a perfluorocarbon, a hydrofluoroether, a fluoroketone, or a hydrofluoroolefin. In some implementations, the power supply 106 and/or the controller 104 are immersed in the two-phase cooling fluid 101.

The circuit board 102 includes multiple IC chips 110 on a common substrate 103. The substrate 103 can be, for example, a semiconductor substrate, a dielectric substrate, or a printed circuit board (PCB). The multiple IC chips 110 can be mounted on a common surface of the substrate 103. For example, the IC chips 110 can be mounted on the substrate 103 using a through-hole, surface-mount, or ball-grid array (BGA) mount that electrically couples the IC chips 110 to conductive (e.g., metal) interconnections on and/or in the substrate 103. The substrate 103 can be substantially planar, and the multiple IC chips 110 can be mounted in a common manner on the substantially planar substrate 103, e.g., using a same mounting method on a same mounting surface of an integral portion of the substrate 103.

In the example of FIG. 1, the IC chips 110 are application-specific integrated circuits (ASICs), but the IC chips 110 can be of any one or more suitable types in various implementations, such as general-purpose processor chips, field-programmable gate array (FPGA) chips, etc. In some implementations, the IC chips 110 have identical or largely similarly circuitry to one another. An example of an IC chip 110 is described in more detail with respect to FIG. 4.

The IC chips 110 receive power (e.g., supply voltages) from power rails 108. Different sets of IC chips 110 can be connected to and receive power (e.g., a supply voltage) from different power rails 108, and/or a power rail 108 can provide power to all IC chips 110. Moreover, in some implementations, each IC chip 110 receives power from multiple power rails 108, e.g., to receive different supply voltage for powering different internal components of the IC chip 110. The power rails 108 receive power supply voltages (which may be the same or different from one another) from the power supply 106. The power rails 108 can include, for example, metal traces, large-area metal contacts (e.g., ground planes), buses, and/or conductive mounts/standoffs between the power supply 106 and the circuit board 102.

Although FIG. 1 illustrates a configuration in which the IC chips 110 receive supply voltages in parallel through separate connections to the rails 108, in some implementations at least some of the IC chips 110 receive supply voltages in a series arrangement, e.g., a configuration in which a chain of multiple IC chips 110 is connected to a rail 108 in series or in a daisy-chain to each receive a power supply voltage.

In some implementations, one or more board temperature sensors 112 are provided on the substrate 103. The board temperature sensors 112 can be arranged in and/or on the substrate 103 and distinct from, or spaced apart from, the IC chips 110. The board temperature sensors 112 can be configured to detect a temperature of the substrate 103 and/or an ambient temperature of the circuit board 102 and/or of the two-phase cooling fluid 101.

In some implementations, one or more fluid temperature sensors 114 are immersed in the two-phase cooling fluid 101 separately from the circuit board 102. For example, the fluid temperature sensors 114 can be arranged on a wall of a tank holding the two-phase cooling fluid 101, can be suspended in the two-phase cooling fluid 101, and/or the like. The fluid temperature sensors 114 can detect an ambient temperature of the two-phase cooling fluid 101.

In some implementations, one or more external temperature sensors 116 are arranged outside the liquid of the two-phase cooling fluid 101, e.g., can be arranged above the tank to measure a temperature of evaporated vapor, can be arranged to measure a temperature of a condenser, and/or can be configured to measure a temperature in a freeboard space above the condenser.

Figure 4:
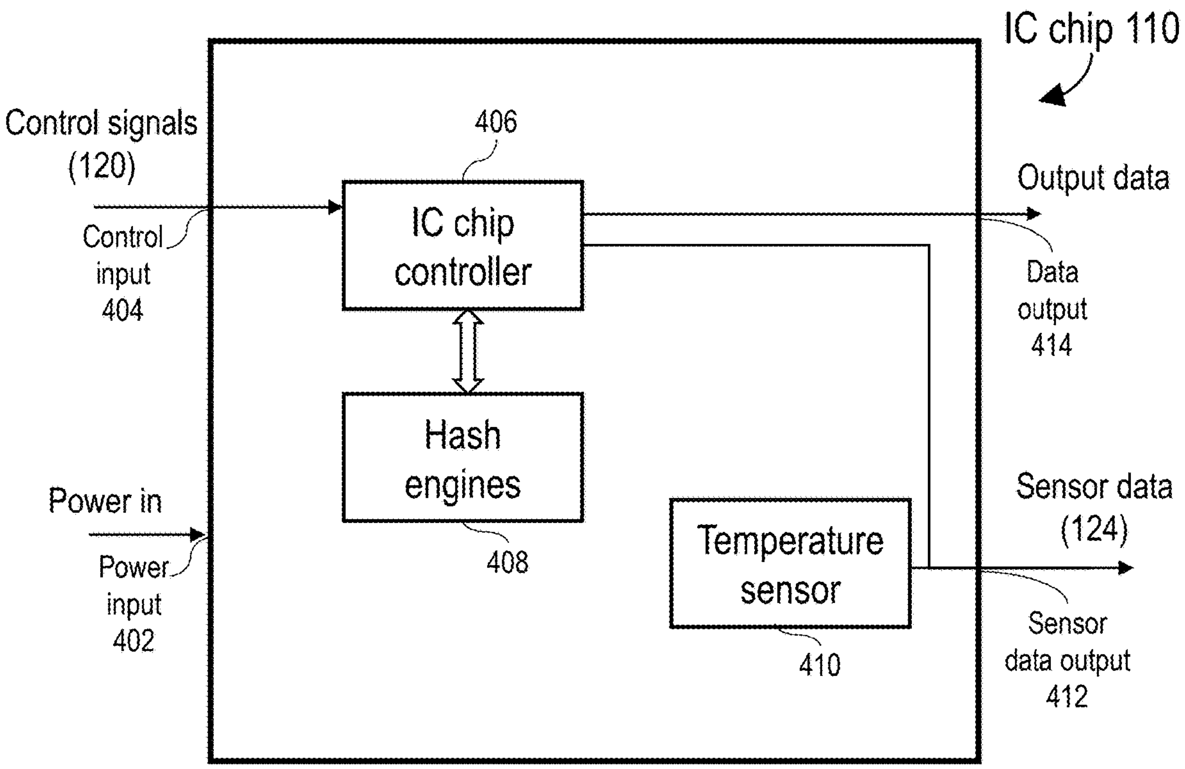
FIG. 4 is a diagram illustrating an example of an IC chip.

As shown in FIG. 4, at least some of the IC chips 110 can include internal temperature sensors 410 that detect the temperatures of the individual IC chips 110, e.g., internal temperatures of the IC chips 110.

The controller 104 can perform power and/or IC chip control. To perform power control, the controller 104 can provide commands to the power supply 106, e.g., commands that indicate voltage(s) to be applied or supplied by the power supply 106 to the rails 108 of the circuit board 102. For example, the controller 104 can send power control signals 124 to the power supply 106. The power control signals 124 can be any suitable signal type, e.g., analog or digital.

To perform IC chip control, the controller 104 can provide commands to the IC chips 110 (e.g., by sending control signals 120 to the IC chips 110). The commands can, for example, cause the IC chips 110 to begin or terminate computations (e.g., hashing), modify the computations performed by the IC chips 110, adjust clock frequencies of the IC chips 110 (e.g., on an IC chip-specific level), and/or control any other aspect of the circuit system 100. The controller 104 can control all IC chips 110 on the circuit board 102 or a subset of the IC chip 110.

The controller 104 can be configured to receive sensor data 122 from the circuit board 102, e.g., from individual IC chips 110. The sensor data 122 from the individual IC chips 110 can indicate, for example, the temperatures measured by the internal temperature sensors 410 of the IC chips 110. In some implementations, the sensor data 122 indicates a clock frequency or other operational parameter of the IC chips 110, such as power consumption and/or calculation/computation rate (e.g., hash rate). The controller 104 can further receive sensor data 122 (indicative of sensed temperatures) from the board temperature sensors 112, the fluid temperature sensors 114, and/or the external temperature sensors 116.

In some implementations, the controller 104 is configured to receive computation results from the IC chips 110, e.g., outputs of cryptographic computations or LLM computations.

The controller 104 can include a computing device, for example, including one or more processors, one or more memories, one or more storage devices, and one or more interfaces suitable for sending and receiving data as illustrated in FIG. 1. For example, the controller 104 can include one or more circuit boards distinct from the circuit board 102 and board(s) of the power supply 106. In some implementations, the controller 104 is at least partially integrated with the power supply 106 and/or the circuit board 102, e.g., shares at least one common component and/or is at least partially co-located on/in a common circuit board. In some implementations, the controller 104 includes multiple computing devices, which may be co-located with one another and/or separate from one another. For example, in some implementations, the controller 104 can include at least one computing device immersed in the two-phase cooling fluid 101 and at least one computing device external to the two-phase cooling fluid 101.

The power supply 106 can be a single power supply unit or can include two or more distinct power supply modules or devices, e.g., in separate enclosures and/or on separate circuit boards. In some implementations, the power supply 106 includes one or more circuit boards, for example, one or more circuit boards and associated other components (e.g., wiring, cooling unit(s), and/or the like) constituting a power supply unit (PSU). The power supply 106 can be connected to the power rails 108 by one or more conductive elements, such as wiring, conductive mounts/standoffs, cables, and/or the like. In some implementations, one or more temperature sensors are included in the power supply 106 and can provide sensed temperatures to the controller 104 for use in the ramp control processes discussed below.

The power supply 106 can be configured to receive an input voltage and to convert the input voltage into output voltages provided to the power rails 108. The power supply 106 can include one or more regulators, rectifiers (e.g., adjustable DC-DC regulators), and/or the like for generating the output voltages. The power supply 106 can generate the output voltages based on the power control signals 124, such that the supply voltage(s) based on which the IC chips 110 operate are controllable/adjustable by the controller 104.

As an example of a configuration of the circuit system 100, in some implementations, the circuit system 100 is configured to perform cryptographic operations, e.g., a blockchain mining process, using the IC chips 110. For example, the circuit system 100 can be deployed for applications that rely on high-performance computing operations such as blockchain operations, e.g., for cryptocurrency mining, maintaining linked records of digital transactions, etc. In this context, a blockchain is a decentralized and distributed digital ledger that records units of information, e.g., transactions, across multiple computers or nodes. In a blockchain, transactions are grouped into blocks and added to a chain of previous block, forming a chronological sequence. Each block includes a unique identifier, e.g., hash value, and a reference to the previous block, creating a linked structure. The blocks in the same blockchain are linked by having their hash values inserted into a designated field, e.g., a block header, in the next sequential block in the blockchain. A process of blockchain mining is designed to allow a blockchain system to reach a consensus in which all computation nodes in the blockchain system agree to a same blockchain. An example of a mining process by a computation node of a blockchain system can include computing a valid proof-of-work for a block candidate that will be added to a blockchain. The proof-of-work for a block can include a nonce value that, when inserted into a designated field of the block, makes the cryptographic hash value of the block meet, e.g., be equal to or less than, a certain difficulty target set by the system.

In some implementations, the circuit system 100 is configured to perform Large Language Model (LLM) computations, or other machine learning computations, using the IC chips 110. For example, the IC chips 110 can be configured specifically for LLM calculations.

In some implementations, the IC chips 110 can be configured or customized to perform computations instructed by the controller 104. For example, the IC chips 110 can receive control signals 120 from the controller 104 instructing the IC chips 110 to perform computations for a particular task. After receiving the control signals 120, each of the IC chips 110 can perform the computations indicated/commanded by the control signals 120 and transmit corresponding output signals, e.g., to the controller 104 or to event detector logic. The output signals can indicate or include results of the computations.

FIG. 4 illustrates an example of an IC chip 110. Although several elements of the IC chip 110 are shown in FIG. 4, the IC chip 110 can optionally include additional elements (e.g., internal modules, internal and/or external connections/interconnections), etc.) without departing from the scope of this disclosure.

The IC chip 110 includes a power input 402 for receiving power (e.g., a DC voltage) from a power rail and a control input 404 for receiving control signals 120, e.g., from controller 104. The power (e.g., supply voltage) received at the power input 402 can be distributed to internal components of the IC chip 110 by internal wiring. As noted above, in some implementations, the IC chip 110 includes multiple power inputs 402 for receiving multiple different supply voltages.

The IC chip 110 further includes an IC chip controller 406 and one or more hash engines 408. The IC chip controller 406 is configured to manage and coordinate operations of various components within the IC chip 110. The IC chip controller 406 can be configured to serve as an interface between the hash engines 408 and other circuits or components of the IC chip 110 and/or external components. For example, the IC chip controller 406 can be configured to receive a control signal 120 from the control input 404, and to transmit a corresponding control signal to the hash engines 408. For example, after receiving a control signal 120 from the controller 104, the IC chip controller 406 can instruct the hash engines 408 to perform cryptographic hash computations. In some implementations, the IC chip controller 406 is communicatively coupled to the hash engines 408, and can obtain computation results from the hash engines 408. The IC chip controller 406 can transmit the computation results and/or values derived therefrom (e.g., signals indicating obtained nonce values) via a data output 414, e.g., to the controller 104 or another computing device. In some implementations, the IC chip controller 406 sets a clock frequency of the IC chip 110 based on the control signals 120. Other methods of setting/adjusting the clock frequency are also within the scope of this disclosure.

In some implementations, each of the one or more hash engines 408 includes hardware components configured to perform cryptographic hash computations. In some implementations, the hash engines 408 can perform the cryptographic hash computations using hash function algorithms such as SHA-1, SHA-256, or MD5, etc.

In some implementations, the IC chip 110 includes one or more circuits specialized for LLM calculations, e.g., instead of or in addition to the one or more hash engines 408.

The IC chip controller 406 and the hash engines 408 can include general-purpose and/or dedicated circuitry, e.g., microprocessor(s), hardware accelerator(s), special-purpose circuitry configured to generate hashes or perform LLM calculations, etc.

In some implementations, the IC chip 110 includes a temperature sensor 410. The temperature sensor 410 can output sensor data indicative of an internal temperature of the IC chip 110. The temperature sensor 410, along with the temperature sensors 112, 114, 116 if included in the circuit system 100, can be any suitable type of temperatures sensor, e.g., a resistive sensor or a diode-based temperature sensor. The sensor data can be included in the sensor data 122 that is output, at a sensor data output 412, to the controller 104. In some implementations, the sensor data 122 can include additional or alternative data indicative of internal operation of the IC chip 110. For example, the sensor data 122 can indicate a power consumption of the IC chip 110, a hash rate of the IC chip 110, and/or a clock frequency of the IC chip 110.

The inputs/outputs 402, 404, 412, 414 can be nodes, pins, bumps, and/or the like.

Figure 2A:
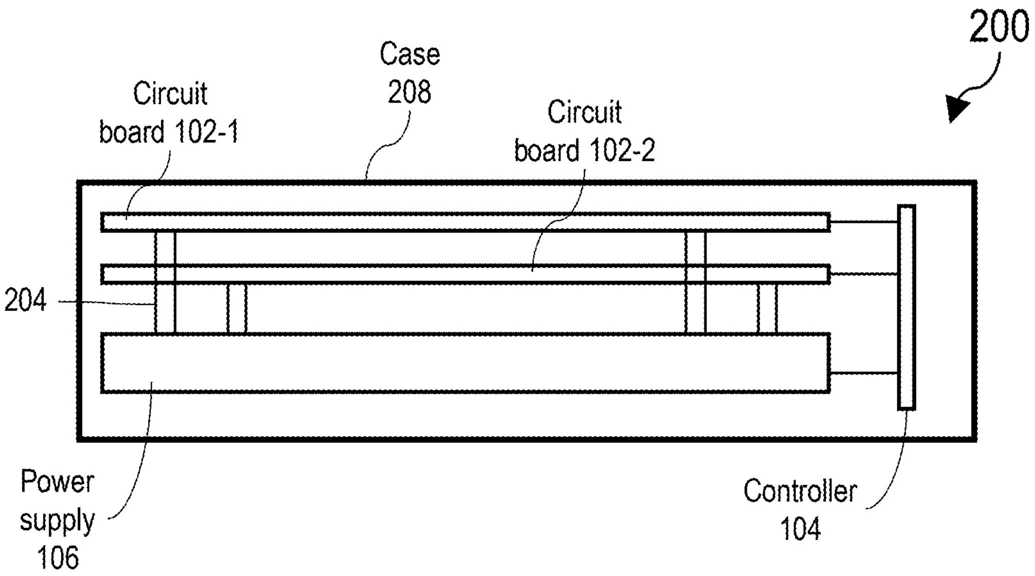
FIG. 2A is a schematic side view of an example of a circuit system incorporating temperature control.

FIG. 2A illustrates an example of a physical configuration of a circuit system 200 incorporating temperature control. The circuit system 200 is similar to the circuit system 100 of FIG. 1, and can have characteristics as described for the circuit system 100 except where noted otherwise or suggested otherwise by context. Unlike the circuit system 100 of FIG. 1, the circuit system 200 includes two circuit boards 102-1, 102-2. Each circuit board 102-1, 102-2 is configured as described for the circuit board 102 and includes multiple IC chips 110.

Conductive standoffs 204 mount the circuit boards 102-1, 102-2 on a power supply 106, which in this example has a circuit board form-factor. The conductive standoffs 204 are configured to carry respective voltages provided by the power supply 106 and provide the respective voltages to respective power rails (for example, multiple power rails on each circuit board 102-1, 102-2). Other power supply configurations are also within the scope of this configuration.

In this example, the controller 104 has a form factor of a vertically-mounted circuit board with connections (e.g., wires/cables) to each of the circuit boards 102-1, 102-2 and the power supply 106. These connections can carry signals conveying sensor data, control signals, commands, computation results, and/or the like.

The four circuit boards of the circuit system 200—the circuit boards 102-1, 102-2, the power supply 106, and the controller 104—are mounted in a common enclosure 208. For example, the enclosure 208 can be rack-mountable enclosure. As noted above, during operation, the enclosure 208 can be immersed in a two-phase cooling fluid. The enclosure 208 can be open such that IC chips 110 within the enclosure 208 are directly exposed to and contact the two-phase cooling fluid.

Figure 2B:
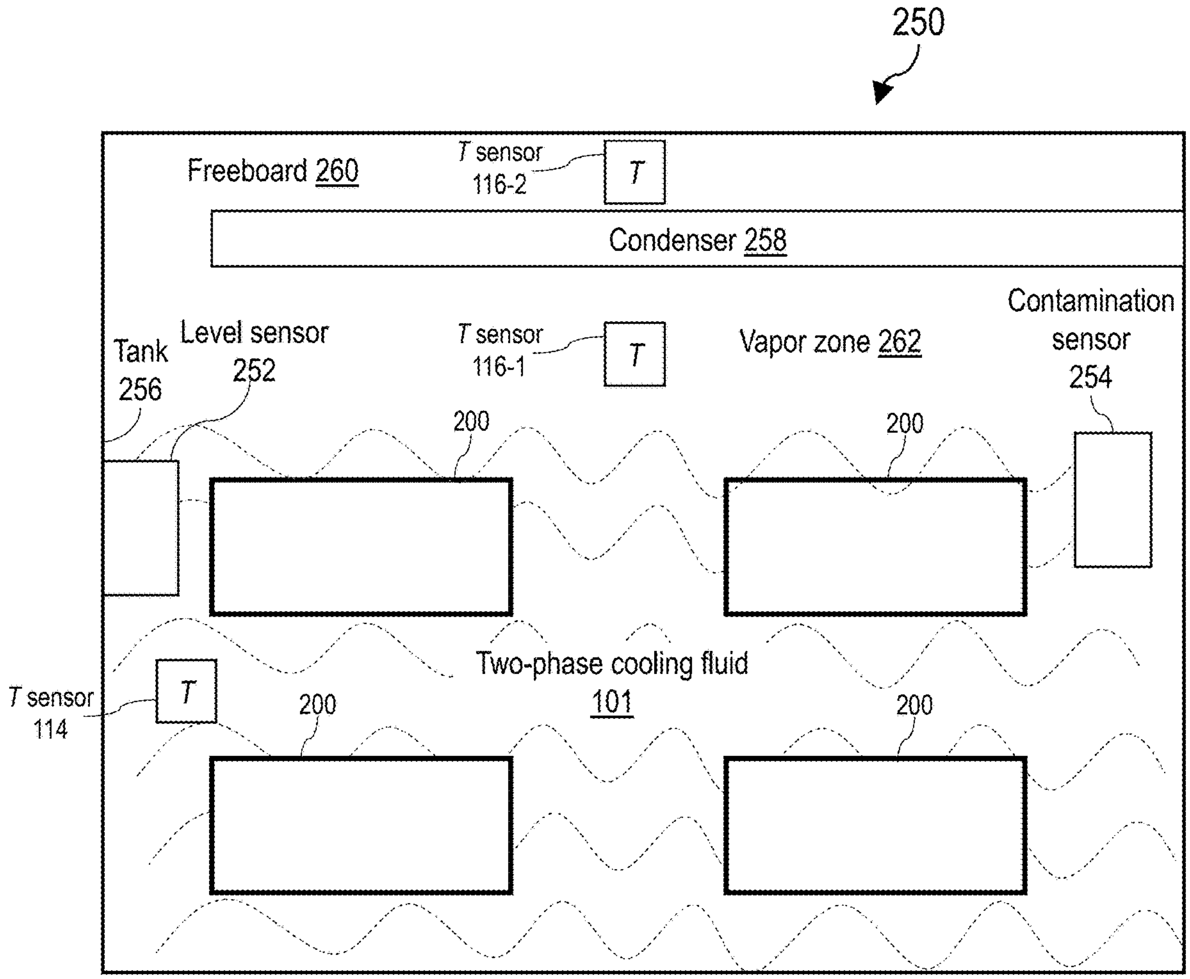
FIG. 2B is a diagram of an example of a cooling system for integrated circuit (IC) chips.

FIG. 2B illustrates an example of a cooling system 250 that includes multiple circuit systems. In this example, each circuit system is the circuit system 200. However, it will be understood that in some implementations at least some of the circuit systems can be different from one another. As another example, the cooling system 250 can include multiple of the circuit systems 100 described with respect to FIG. 1, or portions of the circuit systems 100 (e.g., at least the circuit boards 102 of the circuit systems).

The cooling system 250 includes a tank 256 holding a pool of two-phase cooling fluid 101. Immersed in the two-phase cooling fluid 101 are multiple circuit systems 200. In some implementations, respective controllers 104 of the circuit systems 200 independently execute, or substantially independently execute, the ramp control processes discussed below, such that IC chips 110 of the circuit systems 200 can be ramped independently to full-capacity operation. For example, the controller 104 of each circuit system 200 can be responsible for adjustment of the voltage and/or clock frequency of the IC chips 110 of the circuit system 200, and the controllers 104 of different circuit systems 200 can operate independently from one another. Joint operation of the controllers 104 is also within the scope of this disclosure.

The cooling system 250, in this example, further includes a level sensor 252 configured to sense a level or amount of the two-phase cooling fluid 101 in the tank 256, and a contamination sensor 254 configured to sense a contamination level of the two-phase cooling fluid 101. It may be preferable to not operate at least some IC chips 110 of the cooling system 250 if the fluid level is too low, e.g., if the fluid level is such that the IC chips 110 are no longer immersed. Contamination may compromise the effectiveness of the two-phase cooling fluid 101, e.g., by reducing the heat flux of the two-phase cooling fluid 101. Contaminants can include, for example, oils and particulates.

The cooling system 250 further includes the fluid temperature sensor 114 and external temperature sensors 116 discussed in reference to FIG. 1. In this example, a first external temperature sensor 116-1 is arranged in a vapor zone 262, under a condenser 258, in which evaporated cooling fluid tends to gather during operation, and a second external temperature sensor 116-2 is arranged in a freeboard 260 above the condenser 258. In some implementations, at least one fluid temperature sensor 114 is arranged to sense an ambient fluid temperature.

For clarity, interconnections between components are omitted from FIG. 2B. However, it will be understood that respective controllers 104 of the circuit systems 200 can be connected (e.g., by wires and/or wirelessly) to the sensors 114, 116, 252, and/or 256 to receive signals/data indicative of temperature(s), fluid contamination, and/or fluid level. It will also be understood that the cooling system 250 is an example, and that variations thereof (e.g., with different numbers and/or arrangements of circuit systems, additional or fewer sensors and/or sensor types, etc.) are also within the scope of this disclosure.

Figure 3A:
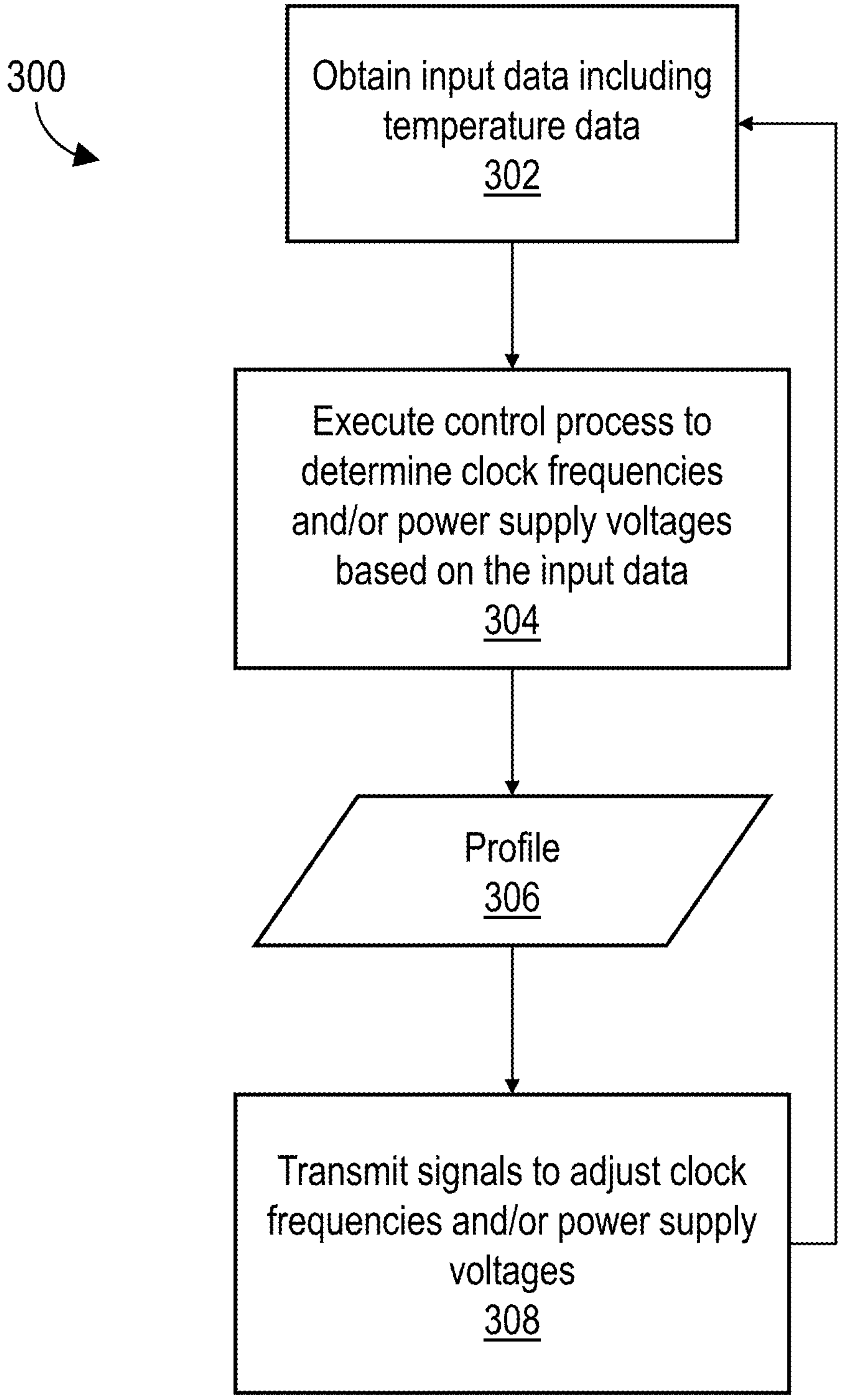
FIGS. 3A-3B are diagrams of examples of control processes for IC chips.

Referring to FIG. 3A, according to some implementations of the present disclosure, a ramp control process 300 is executed to bring the IC chips 110 up to full-capacity operation, e.g., in conjunction with ramping the cooling fluid from a low temperature (e.g., a temperature of the cooling fluid at startup) to a high temperature that is compatible with full-capacity operation of the IC chips 110. The ramp control process 300 can be based entirely or primarily on convective heat transfer to the two-phase cooling fluid and can including ramping/adjusting supply voltages and/or clock frequencies of the IC chips 110 (e.g., IC chips 110 on a common circuit board 102) independently of one another. As such, the IC chips can be ramped to full-capacity operation as quickly as possible while maintaining safe operating temperatures based on individualized considerations and a focus on convective heat transfer.

The process 300 can be performed by the controller 104, e.g., by a controller 104 immersed in the same two-phase cooling fluid as the operated IC chips. As another example, the controller 104 can be external to the two-phase cooling fluid.

The process 300 includes obtaining input data including temperature data (302). The temperature data can include temperature data from one or more of the temperature sensors discussed above, e.g., temperature sensors 410, 112, 114, and/or 116. For example, the temperature data can be obtained from temperature sensors 410, such that the temperature data includes internal temperatures of individual IC chips 110. The input data can also include other data, such as the input data 351 discussed below in reference to operation 304 and FIG. 3B.

The process 300 includes executing a control process to determine clock frequencies and/or power supply voltages of the IC chips 110, based on the input data (e.g., based on the temperature data characterizing internal temperatures of the IC chips 110) (304). For example, the controller 104 can execute a software loop to execute the control process continuously (e.g., once per frequent time interval, such as once per second or more often). Because of the rapid temperature changes that can occur in the convection regime, it can be beneficial to execute the control process at least once per second or once every five seconds, so that undesirable system states can be mitigated before a runaway heating process is initiated.

In some implementations, a rate of execution of the control loop of the control process is variable as a function of one or more variables. For example, the rate of execution can be a function of sensed ambient fluid temperature, IC chip temperature(s), and/or a rate of temperature change. For example, the rate of execution can increase when the temperature changes more quickly, for cooler fluid temperatures at which more careful chip control may be desirable, and/or for hotter IC chip temperatures at which more careful chip control may be desirable. As another example, instead or additionally, the rate of execution can decrease as IC chip performance level (e.g., clock frequency) increases.

In some implementations, the output of the control process includes a data object that indicates, for each of the IC chips 110 (e.g., each of the IC chips 110 on one or more circuit boards controlled by a corresponding controller 104), a power supply voltage and/or clock frequency of the IC chip 110 for a next time-step. For example, the controller 104 can obtain input data (e.g., sensor data) indicative of system parameters at time t and determine, based on the input data, power supply voltage and/or clock frequency at time $t+\Delta t$, where $\Delta t$ is the time interval at which the control process repeats. The data object can be referred to as a "profile," shown in FIG. 3A as profile 306. The data object can include, for example, an array; however, the scope of this disclosure is not limited thereto.

Figure 3B:
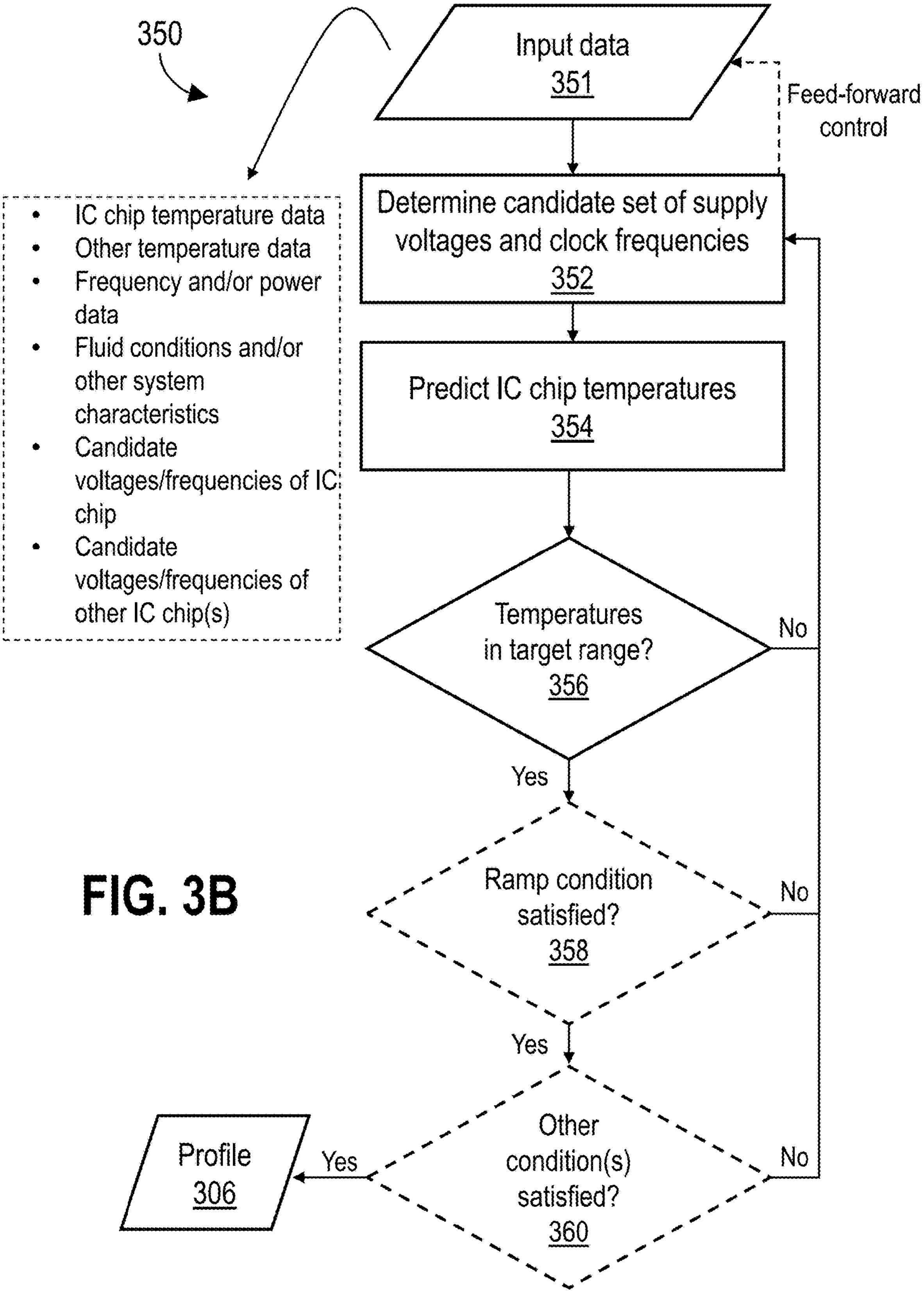

FIG. 3B illustrates an example of a process 350 of determining the profile 306, e.g., determining the clock frequencies and/or power supply voltages of the IC chips 110. The process 350 can be performed as operation 304.

The process 350 includes obtaining input data 351 and determining a candidate set of supply voltages and clock frequencies (352). At least some of the input data 351 can be real-time sensor data. The real-time sensor data characterizes a current state of the circuit system so that the controller 104 can accurately determine operational parameters for the next iteration of operation. The real-time sensor data can include, for example, IC chip temperature data from temperature sensors 410; other temperature data from temperature sensors 112, 114, and/or 116 (e.g., fluid temperature, board temperature, and/or external temperature); frequency data characterizing the clock frequency of IC chips 110; and/or power data characterizing the power consumption of IC chips 110. This data can be received by the controller as sensor data 122.

In some implementations, the input data 351 includes frequency and/or power data, e.g., data characterizing the clock frequency and/or power consumption of IC chips 110 (e.g., as real-time sensor data). This data can be received by the controller as sensor data 122.

In some implementations, the input data 351 includes fluid conditions such as a contamination level, a composition of the cooling fluid, and/or a height/level of the two-phase cooling fluid, e.g., as provided by sensors 252 and/or 254. One or more of these fluid conditions can affect temperature predictions in operation 354. In some implementations, the input data 351 includes other system characteristics, for example, a number of IC chips on a board, a number of boards being controlled by the controller 104, a number of circuit systems (e.g., circuit systems 100 or 200) immersed in the same tank as the controller 104, etc.

In some implementations, the input data 351 includes the candidate set of supply voltages and clock frequencies. For example, the control process can include a feed-forward aspect in which the effects of the candidate set of supply voltages and clock frequencies are predicted in advance. The controller 104 can predict the temperature of an IC chip 110 if the IC chip 110 is controlled to have the supply voltage and clock frequency indicated for the IC chip 110 in the candidate set of supply voltages and clock frequencies. The predicted temperatures may be future temperatures of the IC chips 110, e.g., predicted temperatures as of a next iteration of the control process.

In some implementations, the predicted temperature of a first IC chip 110 is based on the candidate clock frequency and/or supply voltage of a second IC chip 110, to account for localized heating by the second IC chip 110. That is, the control process can account for the effect that control of the second IC chip 110 will have on the temperature of the first IC chip 110, for example, as a function of a distance between, or spatial relationship between, the first IC chip 110 and the second IC chip 110. For example, if the first IC chip 110 and the second IC chip 110 are sufficiently close to one another (e.g., adjacent, within a threshold distance, or on the same circuit board), then, if the clock frequency of the second IC chip 110 is increased—as reflected in the candidate set of supply voltages and clock frequencies—the first IC chip 110 may be heated by the second IC chip 110, as reflected in a corresponding effect on the predicted temperature of the first IC chip 110.

The feed-forward aspect of the control process 350—which can be provided in addition to feedback aspects of the control process 350, which take into account measured or controlled parameters like temperature—can, in some implementations, provide improved system performance. As noted above, during operation in the convection regime, temperature changes induced by frequency/voltage changes may be very rapid. Further, such temperature changes may lead to runaway behavior in which high temperatures reduce the effectiveness of heat transfer, which further raises the temperature, which further reduces heat transfer, etc. In some implementations, feed-forward control allows the controller 104 to predict and mitigate undesirable temperature increases before those temperature increases occur, such that system temperatures can be maintained in target range(s). By contrast, a feedback-only process might be insufficiently responsive to prevent runaway temperature events.

Referring again to FIG. 3B, the process 350 includes predicting IC chip temperatures based on the input data 351 and the candidate set of supply voltages and clock frequencies 352 (354). Operation 352 can be performed using one or more algorithms, transfer functions, and/or the like. The algorithms and/or transfer functions can represent a physical model of heat transfer from IC chips 110 to the two-phase cooling fluid 101. In some implementations, the algorithms and/or transfer functions are based on substantially convective heat transfer.

The prediction of IC chip temperatures can be based on the temperature data of the input data 351. For example, the predicted temperatures can be based on a modulation or change from current IC chip temperatures, as indicated by the internal temperature sensors 410 of the IC chips. The predicted temperatures can be based on a temperature of the two-phase cooling fluid, for example, in that (i) a greater difference between IC chip temperature and fluid temperature may correspond to a higher rate of heat transfer, and/or (ii) heat transfer may be greater when the two-phase cooling fluid is hotter, corresponding to increased boiling.

The prediction of IC chip temperatures can be based on characteristic(s) of the two-phase cooling fluid. For example, in some implementations, a higher level of contamination corresponds to reduced heat transfer. As another example, in some implementations, a lower overall level of the two-phase cooling fluid in the tank corresponds to reduced heat transfer. As another example, batch-to-batch variations of the cooling fluid may result in different predicted IC chip temperatures, e.g., based on different thermal transfer characteristics.

As noted above, the prediction of IC chip temperatures can be based on the candidate supply voltages and/or clock frequencies in a feed-forward manner. For example, a transfer function (and/or a defined relationship, as discussed below) can predict or indicate how a change in frequency and/or voltage for an IC chip will affect the IC chip's temperature. The transfer function can be a function of the temperature of the IC chip and the temperature of the two-phase cooling fluid. For example, the transfer function can be a function of IC chip and/or cooling fluid temperature to match, or account for, the variable heat flux at a given IC chip and/or fluid temperature. In some implementations, the transfer function is additionally a function of the temperature of the circuit board of the IC chip. The same or a different transfer function (e.g., used in addition to the previous transfer function) can predict or indicate how the temperature of the IC chip will be affected by a change in frequency and/or voltage for a second, different IC chip. This effect can be based at least on the proximity between the two IC chips and/or whether the two IC chips are on the same circuit board (e.g., on the same substrate 103). For example, the transfer function can indicate that the temperature will be more affected by changes in frequency and/or voltage when the IC chips are adjacent to one another, physically closer to one another, and/or on the same circuit board.

The determination of the candidate set of supply voltages and/or clock frequencies (and subsequent corresponding control), and the prediction of the IC chip temperatures (e.g., internal IC chip temperatures), can be partially or entirely IC chip-specific. For example, the candidate set of supply voltages and/or clock frequencies can include at least partially different supply voltages and/or clock frequencies for different IC chips (e.g., different IC chips on the same circuit board 102). The prediction of IC chip temperatures can be at least partially specific to IC chips. And, when corresponding control is performed, as described below for operation 308, the IC chips can be controlled to have at least partially different control voltages and/or clock frequencies.

In some implementations, supply voltage and clock frequency are individually controllable for each IC chip. In some implementations, supply voltage and/or clock frequency are controlled for groups of IC chips. For example, a group of IC chips connected to a common power rail can receive the same controllable supply voltage, as provided to and received from that power rail. In some implementations, a group of IC chips that receives a common supply voltage can have different clock frequencies.

To predict IC chip temperatures in a manner specific to each IC chip (independently for each IC chip), method(s) (e.g., transfer functions, algorithms, defined relationships, etc.) used to predict the IC chip temperature can incorporate IC chip-specific parameters. For example, the methods can predict a change in temperature for an IC chip with respect to a current internal temperature of the IC chip, where the current internal temperature of the IC chip is measured specifically for the IC chip and differs from internal temperatures of at least one other IC chip (e.g., on the same circuit board).

As another example, the methods can predict a change in temperature for the IC chip, and the predicted change in temperature can be different from predicted changes in temperature for at least one other IC chip (e.g., on the same circuit board). For example, different IC chips (e.g., on the same board and/or of the same model) may have different temperature responses to the same clock frequency and/or voltage changes, and the equation(s) and/or other methods used to predict the IC chip temperature can account for these differences.

As another example, the methods can account for localized heating predicted for at least one other IC chip in proximity to the IC chip, such that the prediction is specific to the IC chip. As another example, the methods can predict a change in temperature for an IC chip based on the candidate supply voltage and clock frequency for the IC chip, where the candidate supply voltage and/or clock frequency differ from candidate supply voltages and/or clock frequencies for at least one other IC chip (e.g., on the same circuit board).

As such, in some implementations, the process 350 corresponds to independent, distinct predictions of respective internal temperatures for at least some of the IC chips 110. Accordingly, the IC chips 110 can be controlled more independently, precisely, and flexibly to provide safer operation and faster ramping, e.g., compared to if control were performed based only on fluid and/or board temperatures, and compared to if IC chip temperatures were predicted only in the aggregate for groups of IC chips without considering the individual position and/or current state of each IC chip.

In some implementations, a pre-stored, defined relationship between (i) clock frequency and/or supply frequency, and (ii) temperature, and/or changes therein, is used to predict the IC chip temperatures (354). The relationship can be represented as, for example, a lookup table, a standard curve, and/or the like, and can be stored in the controller 104 and/or a data storage accessible to the controller 104. In some implementations, the relationship is derived experimentally, from real-world temperature measurements of IC chips cooled using a two-phase cooling fluid. Instead or additionally, the relationship can be derived based on simulations. The experiments and/or simulations can be experiments and/or simulations of substantially convective cooling.

The relationship can be, for example, a relationship between a change in clock frequency and/or supply voltage and a corresponding change in IC chip temperature, given one or more operating conditions (e.g., current IC chip temperature, current ambient fluid temperature, current clock frequency and/or supply voltage, and/or the like). As such, the complex relationship between cooling capacity and cooling fluid temperature can be studied using real-world experiments and/or simulations, and the results of the study can be applied directly to temperature control.

Referring again to FIG. 3B, the process 350 includes determining whether the predicted temperatures (e.g., internal IC chip temperatures) are in a target range (356), for example, less than a maximum temperature, or between a maximum temperature and a minimum temperature. The target range can be a range associated with safe operation of the IC chips, e.g., a range in which elements of the IC chips will not be, or are unlikely to be, damaged by heat. In some implementations, the target range is less than 110° C., less than 115° C., or less than 120° C. In some implementations, the target range includes temperatures in a range from 100° C. to 110° C. For example, the target range can be 100° C. to 110° C. In some implementations, the target range has a lower limit of at least 90° C. The target range can be the same or different for different IC chips 110.

In some implementations, the target temperature range varies as a function of time, fluid temperature, IC chip temperature, board temperature, and/or proximity to one or more other IC chips (e.g., other IC chip(s) labeled as "hot spots", discussed below). For example, during early stages of the control, while the cooling fluid is still relatively cold, it may be preferable to use a somewhat lower target temperature range, to be more cautious in ramping IC chip operation. As another example, at the beginning of operations, the IC chips 110 may be at room temperature, and it may be unrealistic for the IC chips 110 to reach a high minimum temperature of the target temperature range (e.g., 100° C.) within a single time-step; as such, the lower limit of the target range may be increased as a function of time, to accommodate gradual IC chip heating. In some implementations, the target temperature range (e.g., the minimum and/or maximum temperatures of the range) increases as a function of time, fluid temperature, IC chip temperature, and/or board temperature, commensurate with an increase in IC chip temperature over time.

If the temperatures are not in the target range, a new, different candidate set of supply voltages and/or clock frequencies can be determined (352), and IC chip temperatures can be re-predicted based on the new candidate set (354). The new candidate set of supply voltages and/or clock frequencies can be determined by modifying the previous candidate set of supply voltages and/or clock frequencies based on the predicted temperatures. For example, if the temperature of a particular IC chip is predicted to be higher than the target range, the candidate set of supply voltages and/or clock frequencies can be modified to reduce (i) the supply voltage and/or clock frequency of the particular IC chip, and/or (ii) the supply voltage and/or clock frequency of one or more other IC chips whose operation affects the temperature of the particular IC chip, e.g., based on localized heating. If the temperature of a particular IC chip is predicted to be lower than the target range, the candidate set of supply voltages and/or clock frequencies can be modified to increase (i) the supply voltage and/or clock frequency of the particular IC chip, and/or (ii) the supply voltage and/or clock frequency of one or more other IC chips whose operation affects the temperature of the particular IC chip, e.g., based on localized heating. In some implementations, the different candidate set of supply voltages and/or clock frequencies can be determined using an optimization method, such as—but are not limited to—gradient methods, randomized search methods, genetic algorithm methods, and stochastic methods.

If the temperatures are in the target range, the process 350 continues. In some implementations, the process 350 optionally includes determining whether a ramp condition is satisfied (358). The ramp condition can be related to an overall objective of ramping all IC chips quickly (e.g., as quickly as possible) to their full operational capacity with the two-phase cooling fluid at or near its boiling point. For example, it would hypothetically be possible to operate all IC chips at safe temperatures simply by operating the IC chips at with very low voltages and clock frequencies, but such operation would be incompatible with the overall objective of running the IC chips quickly, e.g., to perform high hash-rate computations using the IC chips.

As such, in some implementations, the ramp condition is included so that supply voltages and clock frequencies continue to increase, subject to the temperature limits discussed with respect to operation 356. For example, in some implementations, the ramp condition includes a target rate (e.g., target range of rates) of IC chip temperature increase. In some implementations, the ramp condition includes a target rate of fluid temperature increase.

In some implementations, the ramp condition is satisfied if the candidate supply voltages and/or clock frequencies are at the maximum values of those parameters, or values of those parameters that are sufficiently high, without resulting in predicted IC chip temperatures outside the target range. For example, determining whether the ramp condition is satisfied (358) can include increasing at least one of the candidate supply voltages and/or clock frequencies, predicting IC chip temperatures based on the updated candidate values (354), and checking whether the updated predicted IC chip temperatures are in the target range (356). If the updated predicted IC chip temperatures are outside the target range, the ramp condition is considered to be satisfied (based on the un-updated candidate values), because the supply voltage and/or clock frequency cannot be raised further without causing unsafe temperatures. If the updated predicted IC chip temperatures are still inside the target range, then the candidate values can be increased further in an iterated process. In some implementations, this process can be performed at least partially on an IC chip-by-IC chip basis, e.g., where supply voltage and/or clock frequency for each IC chip, or for multiple separate groups of IC chips, are increased iteratively, on the level of the IC chip, until each IC chip is predicted to operate at the limit of its safe temperature range. The foregoing processes can provide rapid system ramping while maintaining safe IC chip temperatures.

In some implementations, no separate ramp condition check is performed. For example, the presence of a minimum target IC chip temperature (e.g., a lower bound on the target IC chip temperature range, such as a lower bound of at least 80° C.) may cause ramping to proceed rapidly, because supply voltage and clock frequency will be ramped up to maintain IC chip temperatures above the minimum temperature as the two-phase cooling fluid's cooling becomes more effective with increasing fluid temperature.

If the ramp condition is satisfied, the process 350 continues. If the ramp condition is not satisfied, the process 350 can return to operation 352 with a modified candidate set of supply voltages and/or clock frequencies. For example, at least one of the supply voltages and/or clock frequencies can be iteratively increased until at least one predicted IC chip temperature and/or fluid temperature is predicted to increase at a rate in a target range (subject to the target temperature range of operation 356). As another example, as described above, at least one of the supply voltages and/or clock frequencies can be iteratively increased until at least one IC chip temperature is at the upper end of the target temperature range of operation 356, e.g., is within a threshold value of the maximum temperature or cannot be increased further without exceeding the maximum temperature.

In some implementations, the process 350 optionally includes determining whether one or more other conditions are satisfied (360). The one or more other conditions can include, for example, a maximum-power condition (e.g., a predicted power based on the candidate set up supply voltages and clock frequencies). The maximum power condition may correspond to a preference or mandate of how much power the IC chips should consume, e.g., based on energy price considerations and the like.

If the one or more other conditions are not satisfied, the process 350 can return to operation 352 with a modified candidate set of supply voltages and/or clock frequencies. If the one or more other conditions are satisfied, the candidate set of supply voltages and/or clock frequencies can be selected as the profile 306.

Although FIG. 3B illustrates operations 356, 358, and 360 being performed in sequence and in a specific order, other orders of, and parallelization of, the operations 356, 358, 360 are within the scope of this disclosure. Further, although operations 356, 358, 360 are illustrated as distinct from one another, in some implementations the determination of the profile 306 using process 350 is an optimization process subject to constraints such as a target temperature range constraint (356), a ramp condition constraint (358), and one or more other constraints (360). The controller 104 can use any one or more suitable optimization methods to determine the profile 306. Optimization methods that can be used by the controller 104 can include—but are not limited to—gradient methods, randomized search methods, genetic algorithm methods, and stochastic methods.

Referring again to FIG. 3A, the process 300 includes transmitting signals to adjust clock frequencies and/or power supply voltages to have the values indicated by the profile 306 (308). For example, the controller 104 can send power control signals 124 to the power supply 106 to adjust the power supply voltages, and can send control signals 120 to adjust the clock frequencies. As noted above, the adjusted clock frequencies and power supply voltages can be different from one another between IC chips 110, e.g., IC chips 110 on the same circuit board 102 can be provided with different, independently-determined clock frequencies and/or power supply voltages to quickly ramp the clock frequencies and power supply voltages while maintaining an internal temperature within a target range for each IC chip 110. Further, the processes 300, 350 as described above and below are suitable specifically to cause ramping of clock frequencies, power supply voltages, and fluid temperature in the convection regime while maintaining safe IC chip temperatures.

By contrast, conventional chip control methods tend to focus on steady-state control after chip ramping has concluded, when the two-phase cooling fluid is boiling, resulting in inefficiencies (if ramping occurs unnecessarily slowly) and/or chip damage (if temperature is not sufficiently controlled) during ramping.

In some implementations, the process 300 includes detection of IC chips that differ from other IC chips in their operational characteristics. The presence of these IC chips can then be accounted for when determining supply voltage and/or clock frequencies.

Figure 7:
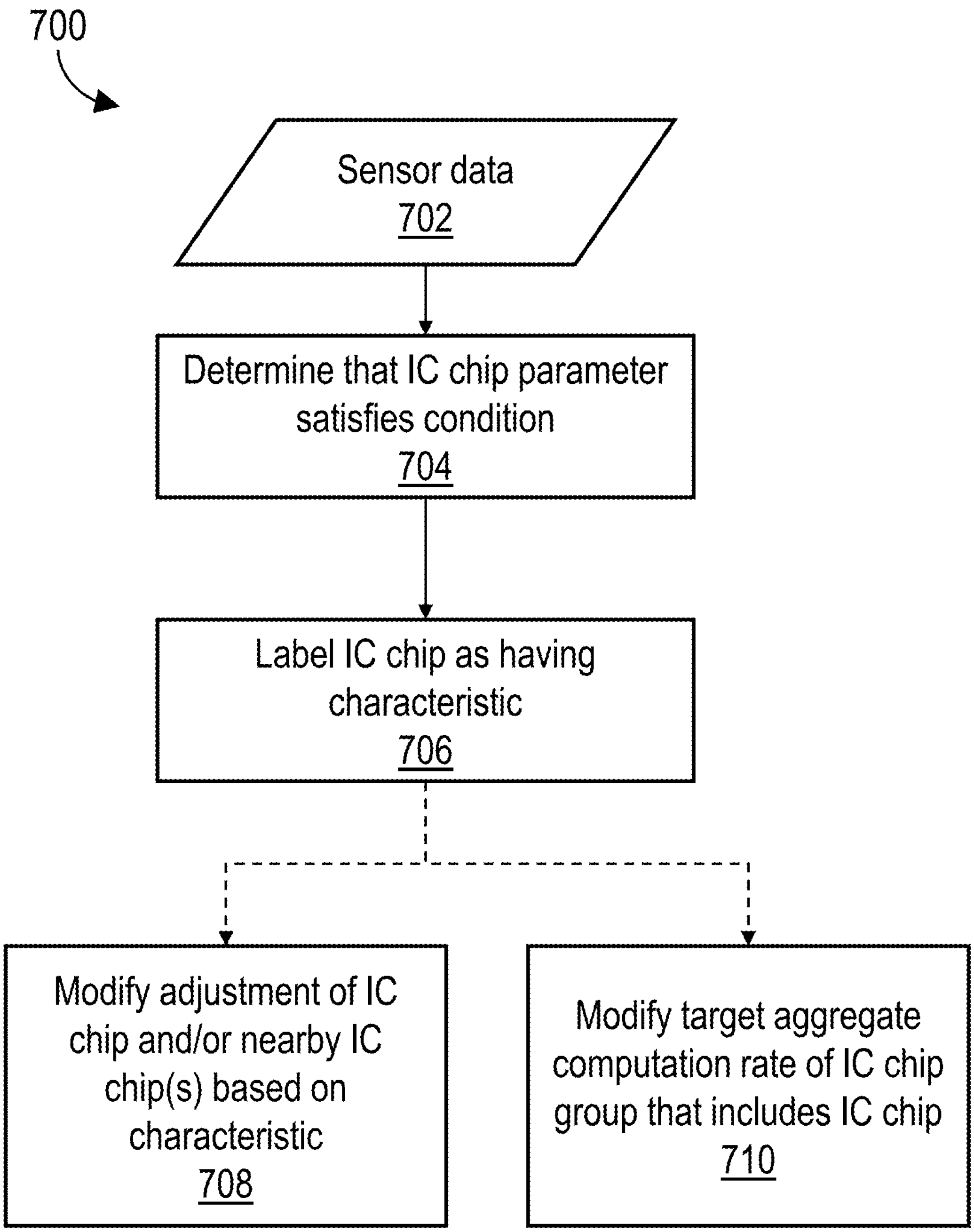
FIG. 7 is a diagram illustrating an example of an IC chip control process.

For example, FIG. 7 illustrates an example of a process 700 for IC chip control based on IC chip-specific considerations. The process 700 can be included in the process 300 and can be performed, for example, by the controller 104.

The process 700 includes obtaining sensor data 702 and determining, based on the sensor data, that a parameter of an IC chip (referred to hereafter as a "first" IC chip) satisfies a condition (704). The sensor data 702 can include, for example, internal temperature data of the first IC chip, ambient fluid temperature data, supply voltage data of the first IC chip, and/or clock frequency data of the first IC chip. The parameter of the first IC chip can be, for example, the internal temperature of the first IC chip, which can satisfy a condition that the internal temperature is above a threshold value (e.g., a maximum safe operating temperature) and/or above a predicted value by at least a threshold amount.

For example, in some implementations, after transmitting signals to set the clock frequency and supply voltage of the first IC chip (308), the controller 104 can compare the updated temperature of the first IC chip to the previously-predicted temperature (354) of the first IC chip corresponding to the updated clock frequency and supply voltage. Assuming accurate prediction, these values should substantially match. If the updated temperature differs from the predicted temperature by at least a threshold amount (e.g., is hotter than the predicted temperature by at least the threshold amount), the controller 104 can determine that the first IC chip satisfies this condition. This can correspond to the first IC chip being a "hot spot" or "running hot" compared to other IC chips, e.g., dissipating more heat than other IC chips for the same operating conditions.

The process 700 includes labeling the first IC chip as having a characteristic based on determining that the parameter of the first IC chip satisfies the condition (706). For example, the controller 104 can flag or otherwise modify a data object corresponding to the first IC chip to indicate that the first IC chip has the characteristic. For example, the first IC chip can be labeled, in a computer storage, as being a "hot spot" IC chip (or as being "de-rated") that is expected to be hotter than other IC chips for the same operating conditions. Such an IC chip can be referred to as being "de-rated." The "characteristic" can be, for example, that the first IC chip becomes hotter or cooler than an average or baseline IC chip for the same operating conditions, that the first IC chip's temperature response to a change in supply voltage and/or clock frequency is different from that of an average or baseline IC chip, and/or the like.

In some implementations, the process 700 includes modifying the adjustment of clock frequency and/or supply voltage for (i) the first IC chip, and/or (ii) IC chip(s) near the first IC chip (e.g., adjacent to the first IC chip on the same circuit board), based on the first IC chip having the characteristic, or based on the first IC chip being labeled as having the characteristic (708). With respect to (i), the characteristic can be reflected in operation 354. For example, equation(s) used to predict a temperature of the first IC chip can include a parameter (e.g., a coefficient) that is modified based on the characteristic. As another example, after a lookup table, standard curve, or other stored relationship is used to obtain a first prediction of the temperature of the first IC chip (e.g., a first prediction that corresponds to a baseline or standard prediction), the first prediction can be modified based on the characteristic, to obtain a second prediction specific to the first IC chip. For example, if the first prediction indicates a temperature $T_1$ and the first IC chip is labeled as a "hot spot," the second prediction can be $T_2=T_1+\Delta T$, a higher temperature. As a result, the first IC chip will tend to be operated at lower clock frequency and/or supply voltage than a baseline IC chip.

With respect to (ii) in the foregoing example, a similar process can be applied as described above for accounting for localized heating. In this case, the predicted localized heating may be increased or decreased compared to a baseline case in which the first IC chip lacks the characteristic. For example, if the first IC chip is labeled as a "hot spot," nearby IC chips are likely to also have higher temperatures due to the first IC chip's higher temperature, for a given set of operating conditions.

In some implementations, the process 700 instead or additionally includes modifying a target aggregate computation rate (e.g., hash rate) for a group of IC chips that includes the first IC chip. The group of IC chips may be, for example, a group of IC chips sharing a common power supply, a group of IC chips sharing a daisy-chained power supply (e.g., a "Christmas tree" power supply configuration), and/or a group of IC chips transmitting control and/or output signals in a daisy-chained or forwarded arrangement, though the group of IC chips need not have one of these relationships. In the absence of modification of the target aggregate computation rate, if the first IC chip is de-rated, then other IC chip(s) in the group may have to operate at too-high levels (e.g., too-high supply voltage and/or clock frequency) in order for the group as a whole to achieve its target aggregate computation rate, given that the first IC chip is likely to contribute less than a baseline IC chip to the aggregate computation rate. This compensation may result in the other IC chip(s) becoming too hot. By lowering the target aggregate computation rate for the group, the group can meet the lowered target aggregate computation rate and the other IC chip(s) can operate at safe levels.

In some implementations (for example, based on the process 700), the control processes distinguished herein are "stateful" processes that can be distinguished from combinatorial processes in which the output of each iteration of the control algorithm is a direct function of the current system state (e.g., current measured temperatures and operating parameters). Rather, in some implementations, information from prior iterations of the control algorithm is used in determining supply voltage and clock frequencies in a current iteration. The de-rating of an IC chip (labeling of the IC chip as a "hot spot") can be an example of this configuration: the IC chip can be de-rated based on measurements in one iteration, and that de-rating can then affect control outputs in future iterations. As another example, temperature measurements from prior iterations can be used to identify temperature trends that may result in modified temperature predictions in the current iteration, e.g., if the fluid is heating at a different rate than expected.

In control processes discussed herein, such as processes 300 and 350, the supply voltage and clock frequency may be independently determined/tunable, or may be linked in a one-to-one relationship, without departing from the scope of this disclosure. For example, in some implementations, supply voltage is a function of clock frequency or vice-versa, such that only one of the two values needs to be expressly determined, and the other of the two values follows directly from determination of the first of the two values.

Figure 5:
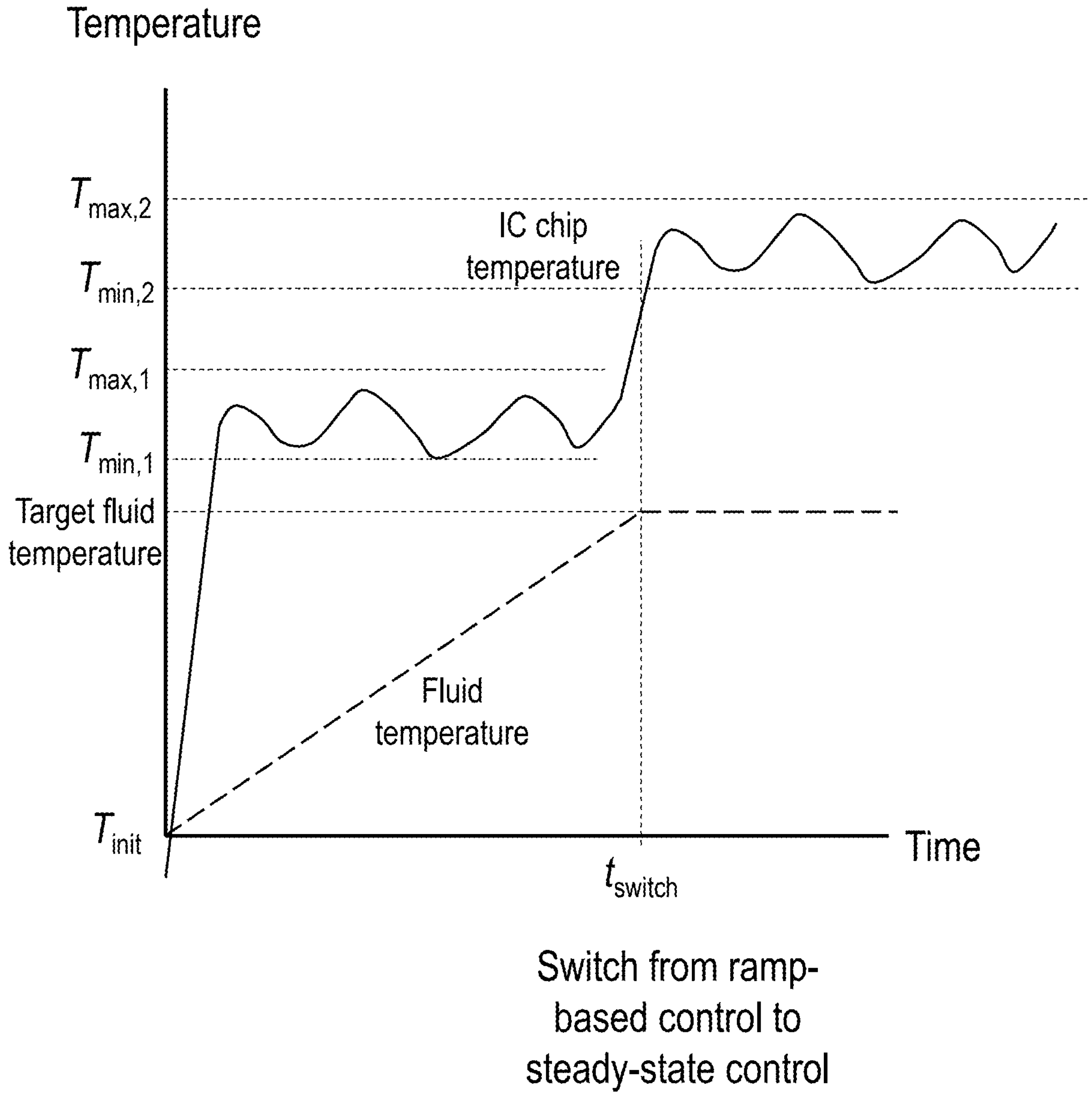
FIG. 5 is a plot illustrating examples of temperature as a function of time.

FIG. 5 shows examples of an internal IC chip temperature and a two-phase cooling fluid temperature as a function of time. The components can begin at an initial temperature $T_{init}$, e.g., a temperature in a range from 15° C. to 30° C., such as room temperature. Upon startup, the IC chip temperature rapidly reaches a first target temperature range from $T_{min,1}$ and $T_{max,1}$, e.g., where $T_{min,1}$ is in a range from 60° C. to 80° C. and $T_{max,1}$ is in a range from 70° C. to 100° C. The first target temperature range can be higher than a boiling temperature of the two-phase cooling fluid, which in the case of FIG. 5 is illustrated as a target fluid temperature.

When the IC chip temperature is in the first target temperature range, the controller 104 performs control as described with respect to FIGS. 3A-3B, to maintain the IC chip temperature within the target range while continuing to ramp the clock frequency and supply voltage of the IC chip. It will be understood that the generally steady temperature of the IC chip shown in FIG. 5, in this phase of operation, can correspond to increasing clock frequency and/or supply voltage as a function of time. For example, in some implementations, as the ambient temperature of the two-phase cooling fluid increases over time, localized boiling of the two-phase cooling fluid also increases over time, corresponding to increased cooling capacity. As such, over time, a given target IC chip temperature may support higher clock frequency and/or supply voltage. Correspondingly, target temperature control may effectively result in control to rapidly and safely ramp the two-phase cooling fluid's temperature, because higher levels of operation of the IC chips may be used over time in order to remain in the first target temperature range.

The fluid temperature increases over time based on operation of IC chips immersed in the fluid, e.g., based on heat transfer from the IC chips to the fluid. In some implementations, the fluid is heated solely by the IC chips, e.g., without a dedicated heater. In some implementations, a dedicated heater is present to cause the fluid to heat more rapidly. The heater, if present, can be controlled by the controller 104 or by another device.

In some implementations, the first target temperature range is constant in the convection regime. In some implementations, the first target temperature range changes as a function of time in the convection regime. For example, $T_{min,1}$ and/or $T_{max,1}$ can increase as a function of time. In some implementations, $T_{min,1}$ and/or $T_{max,1}$ can change as a function of ambient fluid temperature, e.g., can increase with increasing ambient fluid temperature. This adjustment may correspond to increased cooling capacity of the two-phase cooling fluid with increasing ambient fluid temperature (e.g., based on increased localized boiling), and/or can correspond to increased confidence in temperature regulation as the two-phase cooling fluid increases in temperature, which permits higher IC chip temperatures.

At time $t_{switch}$, the fluid reaches a target fluid temperature, e.g., as indicated by one or more temperature sensors 114 immersed in the fluid. The target fluid temperature can be, for example, the boiling temperature (boiling point) of the two-phase cooling fluid or a temperature within a defined range of the boiling temperature. The boiling temperature can be the boiling temperature at atmospheric pressure or at a different pressure at which the cooling fluid is maintained during operation. In some implementations, the target fluid temperature is a temperature at which the fluid exhibits critical heat flux (corresponding to maximum cooling capacity). The target fluid temperature can vary based on a composition of the two-phase cooling fluid. In some implementations, the target fluid temperature is in a range from 40° C. to 60° C. The time $t_{switch}$ between startup and initiation of steady-state operation can vary and may be, for example, between five minutes and ten minutes.

In response to the fluid reaching the target temperature, the controller 104 can switch from the ramp-directed control described with respect to FIGS. 3A-3B to another control process. For example, the controller 104 can implement a suitable dynamic voltage and frequency scaling (DVFS) algorithm to continue to monitor IC chip temperatures and adjust IC chip supply voltage and clock frequency during substantially steady-state operation of the IC chips. During this period, the IC chips operate at or near full capacity, e.g., to perform hashing operations and/or other cryptographic or cryptocurrency mining operations. For example, during this period, the IC chips can be controlled as described in U.S. Pat. No. 12,026,550, incorporated herein by reference in its entirety. In some implementations, during this period, the IC chips are controlled to be in a second target temperature range $T_{min,2}$ to $T_{max,2}$. This range can be higher than the first target temperature range, e.g., $T_{min,2}>T_{max,1}$, to reflect significantly increased cooling capacity when the fluid is boiling.

In some implementations, instead of or in addition to switching control methods based on a sensed ambient fluid temperature, the controller 104 can detect whether the cooling fluid is boiling based on changes in temperature (e.g., the derivative of temperature). Rapid temperature changes may be indicative of a change in operation regime.

It will be understood that FIG. 5 is a conceptual illustration and that the curve shapes illustrated are not restrictive.

Figure 6:
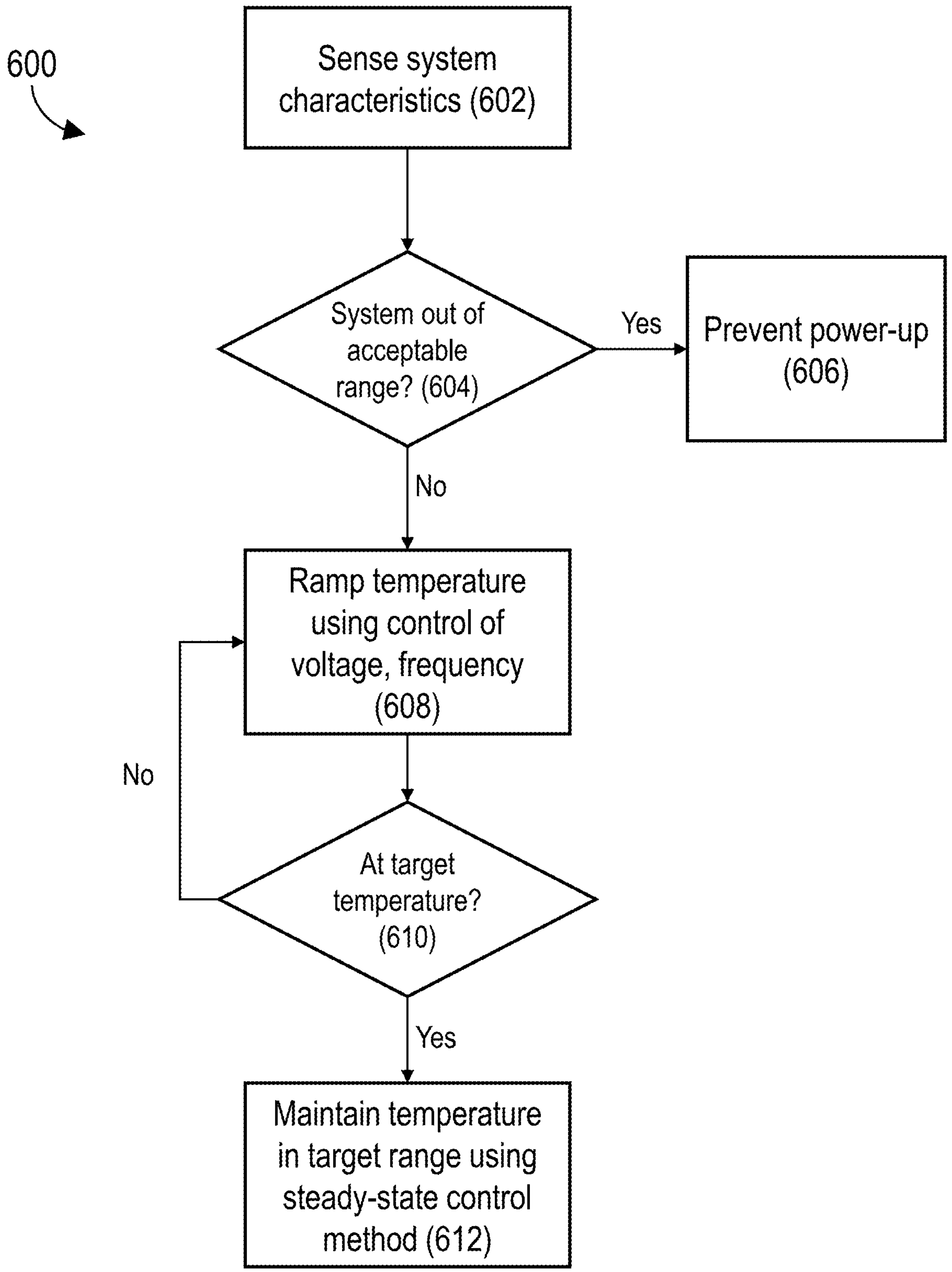
FIG. 6 is a diagram illustrating an example of a control process for IC chips.

FIG. 6 illustrates an example of a process 600 of circuit system control. The process 600 can be performed by the controller 104. The process 600 can correspond to an entire control sequence from startup through steady-state operation of the circuit system.

The process 600 includes sensing system characteristics (602). The system characteristics can include, for example, an amount or level of two-phase cooling fluid 101 in the tank 256 (as sensed by level sensor 252) and/or a level of contamination of the two-phase cooling fluid 101 (as sensed by contamination sensor 254). The controller 104 can receive signals indicative of these values from the corresponding sensor(s).

The process 600 includes determining whether any of the system characteristics are outside a corresponding acceptable range (604). For example, it can be determined whether the level of the two-phase cooling fluid is less than a minimum value (corresponding to insufficient two-phase cooling fluid) and/or whether the contamination level of the two-phase cooling fluid exceeds a threshold value. If any of the system characteristics are determined to be unacceptable, power-up can be prevented (604), e.g., the process 600 can be terminated without ramping the IC chips.

The process 600 includes, if the system characteristics are acceptable, ramping fluid temperature using control of supply voltage and clock frequency (608). Operation 608 can include the processes 300, 350, and/or 700 discussed with respect to FIGS. 3A-3B and 7. For example, operation 608 can include ramping supply voltage and clock frequency subject to a target range of IC chip temperature, while the two-phase cooling fluid is in the convection regime.

The process 600 includes determining whether the two-phase cooling fluid is at a target temperature (610). For example, the target temperature can be the target fluid temperature discussed with respect to FIG. 5, e.g., the two-phase cooling fluid's boiling point or a temperature close to the boiling point. In some implementations, instead of or in addition to determining whether the two-phase cooling fluid is at the target temperature, operation 610 includes determining whether the temperature of the two-phase cooling fluid is stable/non-increasing or whether a rate of increase of the temperature of the two-phase cooling fluid is below a threshold value.

Operations 608 and 610 can repeat until operation 610 is satisfied, corresponding to transition from the convection regime to a regime in which heat transfer is based primarily on liquid-gas phase transitions by the two-phase cooling fluid. Subsequently, the controller 104 can use a steady-state control method (e.g., a DVFS method) to maintain IC chip temperatures in a target range (612), in some cases subject to one or more other constraints such as a maximum power consumption, a target hash rate, etc.

Accordingly, based on the foregoing systems and control processes, IC chips cooled using a two-phase cooling fluid can be ramped in a controlled manner up to full operational capacity. The ramping can occur while the two-phase cooling fluid is in the convection regime, with the foregoing control processes configured to maintain IC chip temperatures in a safe range in the convection regime based on, for example, independent sensing and control of individual IC chips and feed-forward temperature predictions. Tests have demonstrated that the systems and control processes discussed herein can result in maximum IC chip temperature in the convection regime being reduced by at least 10° C. compared to alternative control processes.

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, the controller 104, the IC chip controller 406, and/or the hash engines 408 can be implemented using digital electronic circuitry, or in computer software, firmware, or hardware, or in combinations of one or more of them. As another example, the processes 300, 350, and 600 can be performed using, or by, digital electronic circuitry, or in computer software, firmware, or hardware, or in combinations of one or more of them.

Some implementations described in this specification (e.g., the processes 300, 350, 600, and/or 700) can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices). The computer storage medium is non-transitory.

The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 8:
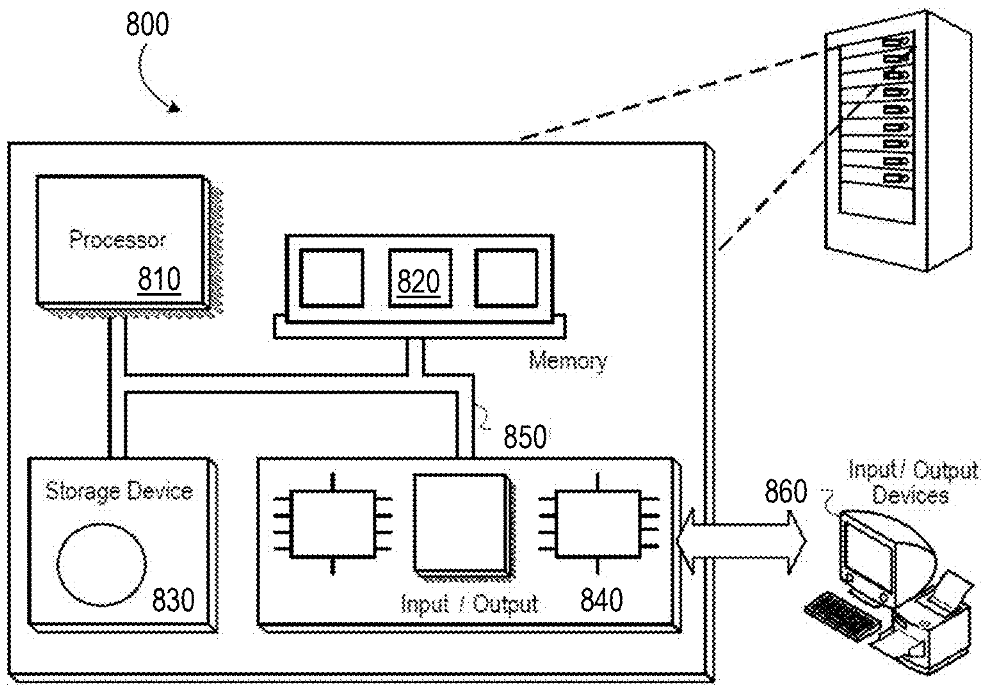
FIG. 8 is a diagram illustrating an example of a computer system.

FIG. 8 illustrates an example of a computer system 800 that includes a processor 810, a memory 820, a storage device 830 and an input/output device 840. Each of the components 810, 820, 830 and 840 can be interconnected, for example, by a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. In some implementations, the controller 104, the IC chip controller 406, and/or the hash engines 408 can be implemented using the processors 810 and/or using multiple such processors 810, or using the computer system 800 or multiple such computer systems 800. The memory 820 and the storage device 830 can store information within the system 800.

The input/output device 840 provides input/output operations for the system 800. In some implementations, the input/output device 840 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device 840 can include driver devices configured to receive input data and send output data to other input/output devices, for example, keyboard, printer and display devices 860. In some implementations, the input/output device 840 can include device interconnections such as cabling, wiring, signal-carrying standoffs, bump bonds, and/or the like. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, various modifications can be made without departing from the spirit and scope of this disclosure.

What is claimed is:

1. A circuit system, comprising:

a circuit board comprising a plurality of integrated circuit (IC) chips, wherein the circuit board is configured to be immersed in a two-phase cooling fluid; and a controller communicably coupled to the circuit board, wherein the controller is configured to:

use a first control method to adjust at least one of clock frequencies or power supply voltages of the plurality of the IC chips to cause a temperature of the two-phase cooling fluid to increase, obtain temperature data indicative of the temperature of the two-phase cooling fluid, and based on the temperature of the two-phase cooling fluid satisfying a target condition, switch from the first control method to a second control method, and use the second control method to adjust at least one of the clock frequencies and the power supply voltages of the plurality of the IC chips.

2. The circuit system of claim 1, wherein the target condition comprises that the temperature of the two-phase cooling fluid is in a target temperature range.

3. The circuit system of claim 1, wherein the condition comprises at least one of:

the temperature of the two-phase cooling fluid is stable or non-increasing, or a rate of increase of the temperature of the two-phase cooling fluid is below a threshold value.

4. The circuit system of claim 1, wherein the first control method comprises:

predicting respective future internal temperatures of the plurality of IC chips; and adjusting the clock frequencies and the power supply voltages of the plurality of the IC chips such that the predicted respective future internal temperatures are within a target temperature range.

5. The circuit system of claim 4, wherein the first control method is iterative, and wherein, for a same iteration of the first control method, a predicted change in internal temperature of a first IC chip of the plurality of IC chips is different from a predicted change in internal temperature of a second IC chip of the plurality of IC chips.

6. The circuit system of claim 1, wherein the second control method comprises a dynamic voltage and frequency scaling (DVFS) algorithm.

7. The circuit system of claim 1, wherein the controller is configured to modify a target temperature range of the plurality of IC chips based on the temperature of the two-phase cooling fluid satisfying the condition.

8. The circuit system of claim 1, wherein the controller is configured to:

use the first control method when the two-phase cooling fluid is in a convection regime, and use the second control method when the two-phase cooling fluid is in a regime in which heat transfer is based primarily on liquid-gas phase transitions by the two-phase cooling fluid.

9. The circuit system of claim 1, wherein the second control method is configured to cause temperatures of the plurality of IC chips to be within a target temperature range.

10. The circuit system of claim 1, wherein the first control method comprises a feed-forward method.

11. The circuit system of claim 1, wherein the controller is configured to use the second control method when the two-phase cooling fluid is boiling.

12. The circuit system of claim 1, wherein a clock frequency of a first IC chip of the plurality of IC chips is adjusted to be different from a clock frequency of a second IC chip of the plurality of IC chips.

13. The circuit system of claim 1, comprising the two-phase cooling fluid, wherein the circuit board is immersed in the two-phase cooling fluid.

14. The circuit system of claim 1, wherein the controller is mounted in a common enclosure with the circuit board and is configured to be immersed in the two-phase cooling fluid.

15. The circuit system of claim 1, wherein the controller is configured to, prior to using the using the first control method:

sense at least one system characteristic, the at least one system characteristic comprising at least one of an amount of the two-phase cooling fluid or a level of contamination of the two-phase cooling fluid; and based on the at least one system characteristic being in a target range, initiating usage of the first control method.

16. A circuit system control method comprising:

adjusting, using a first control method, at least one of clock frequencies or power supply voltages of a plurality of the integrated circuit (IC) chips embedded in a circuit board immersed in a two-phase cooling fluid, wherein the adjusting causes a temperature of the two-phase cooling fluid to increase;

obtaining temperature data indicative of the temperature of the two-phase cooling fluid; and based on the temperature of the two-phase cooling fluid satisfying a target condition, switching from the first control method to a second control method, and adjusting at least one of the clock frequencies or the power supply voltages of the plurality of the IC chips using the second control method.

17. The circuit system control method of claim 16, wherein the target condition comprises at least one of:

the temperature of the two-phase cooling fluid is in a target range, the temperature of the two-phase cooling fluid is stable or non-increasing, or a rate of increase of the temperature of the two-phase cooling fluid is below a threshold value.

18. The circuit system control method of claim 16, wherein the first control method comprises a feed-forward method, and wherein the second control method comprises a dynamic voltage and frequency scaling (DVFS) algorithm.

19. The circuit system control method of claim 16, comprising:

adjusting at least one of the clock frequencies or the power supply voltages using the first control method when the two-phase cooling fluid is in a convection regime, and adjusting at least one of the clock frequencies or the power supply voltages using the second control method when the two-phase cooling fluid is in a regime in which heat transfer is based primarily on liquid-gas phase transitions by the two-phase cooling fluid.

20. The circuit system control method of claim 16, wherein using the first control method comprises:

predicting respective future internal temperatures of the plurality of IC chips; and adjusting the clock frequencies and the power supply voltages of the plurality of the IC chips such that the predicted respective future internal temperatures are within a target temperature range.

* * * * *